March 17, 1970  R. J. DURAN ET AL  3,500,620

ELECTRIC LAWNMOWER CONSTRUCTION

Filed May 5, 1967  5 Sheets-Sheet 1

INVENTORS
RAYMOND J. DURAN
WILLIAM R. LESSIG III
HENRY J. STIELPER
BY Joseph R. Slotnik
ATTORNEY United States Patent Office 3,500,620
Patented Mar. 17, 1970

3,500,620
ELECTRIC LAWNMOWER CONSTRUCTION
Raymond J. Duran, Lutherville, and William R. Lessig III and Henry J. Stielper, Baltimore, Md., assignors to The Black and Decker Manufacturing Company, Towson, Md., a corporation of Maryland
Filed May 5, 1967, Ser. No. 636,343
Int. Cl. A01d 35/26
U.S. Cl. 56—25.4         22 Claims

ABSTRACT OF THE DISCLOSURE

The device hereinafter disclosed relates to a lawnmower of the type having an inverted, generally cup-shaped housing supported for movement along the ground by a plurality of wheels and provided with an upstanding handle for control and manipulation of the mower. A set of mowing blades are supported beneath and within the housing for rotation in a plane generally parallel to the ground and the blades are driven by an electric motor supported atop the housing. As the mower moves over the ground, grass is cut by the rotating blades and is discharged from within the housing through a laterally directed opening. The handle is pivotally reversible on the housing so that the mower may be pushed in both a forward and reverse longitudinal direction without turning the mower around. The mower is constructed and arranged for maximum operator protection against electrical shock, movement of the blades and objects struck thereby, and meets or exceeds American Standards Association (ASA), Underwriters Laboratory (UL) and other safety specifications.

BRIEF SUMMARY OF THE INVENTION

The present invention resides in a novel electric powered, rotary lawn mower construction wherein the electric motor and power cords are functionally insulated to render them safe to touch during normal mower operations, and wherein the exposed mower parts are protectively insulated from the electric motor and power cords in a fashion calculated to provide operator safety even in the event of careless mower operation or in the event the functional insulation fails. The construction of the present invention contemplates a protected motor supported upon, but insulated from, a deck housing and interconnected with, but insulated from, one or more rotary blades to rotate the latter in a common plane. The blades also are electrically insulated from the other mower parts to prevent the latter from becoming electrically "live" in the event the power cord is cut by the blades. Also, the blades are constructed and arranged to provide an uninterrupted cutting path across the mower width but cannot collide with each other. Further, the electric motor and the mower components associated therewith are constructed to facilitate quick and accurate motor attachment as well as motor assembly and disassembly for purposes of part replacement and/or repair. Finally, the motor, motor housing and associated structure provide for relatively cool motor operation.

Accordingly, main objects of the present invention are to provide an improved rotary, electric lawnmower construction which provides maximum safety for the operator, facilitates easy and accurate motor attachment and assembly, and which provides for cool motor operation.

More particular objects of the present invention are to provide an improved rotary, electric lawnmower construction which functionally and protectively insulates the electric motor, power cord and blades, encloses and protects a plurality of rotary blades and prevents collision therebetween while providing a continuous cutting path across the mower width, and which directs the grass cuttings safely away from the operator.

Further important objects of the present invention are to provide an improved mower construction of the above character which includes a deck housing and an electric motor, wherein the electric motor includes a motor housing insulated from and adjustably secured to the deck housing and wherein the motor housing may be easily assembled and disassembled for part repair and/or replacement without removing the same from the deck housing.

Additional important objects of the present invention are to provide an improved mower construction of the above character and which achieves the above stated objects while being relatively inexpensive to manufacture, rugged in construction, light in weight, neat and aesthetically pleasing in appearance and reliable in use.

Other objects and advantages of the present invention will become more apparent from a consideration of the detailed description and claims taken together with the drawings to follow.

BROAD STATEMENT OF THE INVENTION

Broadly described, the present invention relates to a lawnmower of the type having a deck housing supported for longitudinal movement over the ground, a plurality of mowing blades fixed to spindles rotatably supported upon said deck housing, electric motor means on said deck housing and including a motor shaft, belt means interconnecting said motor shaft and said spindles; that improvement which comprises a housing for said motor supported on said deck housing, said motor housing having a base portion provided with a plurality of spaced apertures, said deck housing having spaced apertures aligned with said aperutres in said base portion, fastener means extending through aligned ones of said apertures, aligned ones of said apertures in said motor housing base portion and said deck housing being elongated in directions transverse to each other, respectively, whereby to permit lateral adjustment of said motor housing relative to said deck housing, and insulator means interposed between said base portion and said deck housing adjacent said apertures electrically insulating said base portion from said deck housing.

In another aspect, the present invention relates to a lawnmower of the type having a deck housing supported for longitudinal movement along the ground, mowing blade means rotatably supported beneath said deck housing, electric motor means supported atop said deck housing; that improvement which comprises at least one spindle driven by said motor and extending through said deck housing, at least one blade having a central aperture and positioned on the lower end of said spindle, insulator means fitted into said aperture of said at least one blade and overlaying a portion thereof on opposite sides thereof, said at least one spindle having a fastener threaded on the lower end thereof for retaining said at least one blade in place thereon, shoulder means on said at least one spindle above said at least one blade, said threaded fastener being adapted to operatively engage and press said insulator means into operative engagement with said shoulder means.

In still another aspect, the present invention relates to a lawnmower of the type having a deck housing supported for longitudinal movement along the ground, mowing blade means rotatably supported beneath said deck housing, electric motor means including a motor housing supported atop said deck housing and adjustable laterally relative thereto; and includes that improvement which comprises a shroud secured to said deck housing and covering said motor housing, said motor housing having air inlet and outlet openings adjacent opposite ends thereof, fan means for drawing motor cooling air into said inlet openings and discharging it through said outlet openings, baffle means associated with said shroud and motor housing between said inlet and outlet openings, said baffle means including separate first and second baffle members, one of which is carried by said shroud and the other by said motor housing, said baffle members having adjacent faces which are cooperatively engageable in all adjusted positions of said motor housing, said shroud having inlet openings formed therein on the same side of said baffle means as said motor housing inlet openings, whereby cooling air passes into the shroud and thence into the motor housing inlet openings and through said motor housing, said shroud and said deck housing being constructed and arranged to deliver air, discharged from said motor housing outlet openings, outwardly of said shroud and above said deck housing.

DESCRIPTION OF PREFERRED EMBODIMENT

Figures 1, 6, 9, 10:
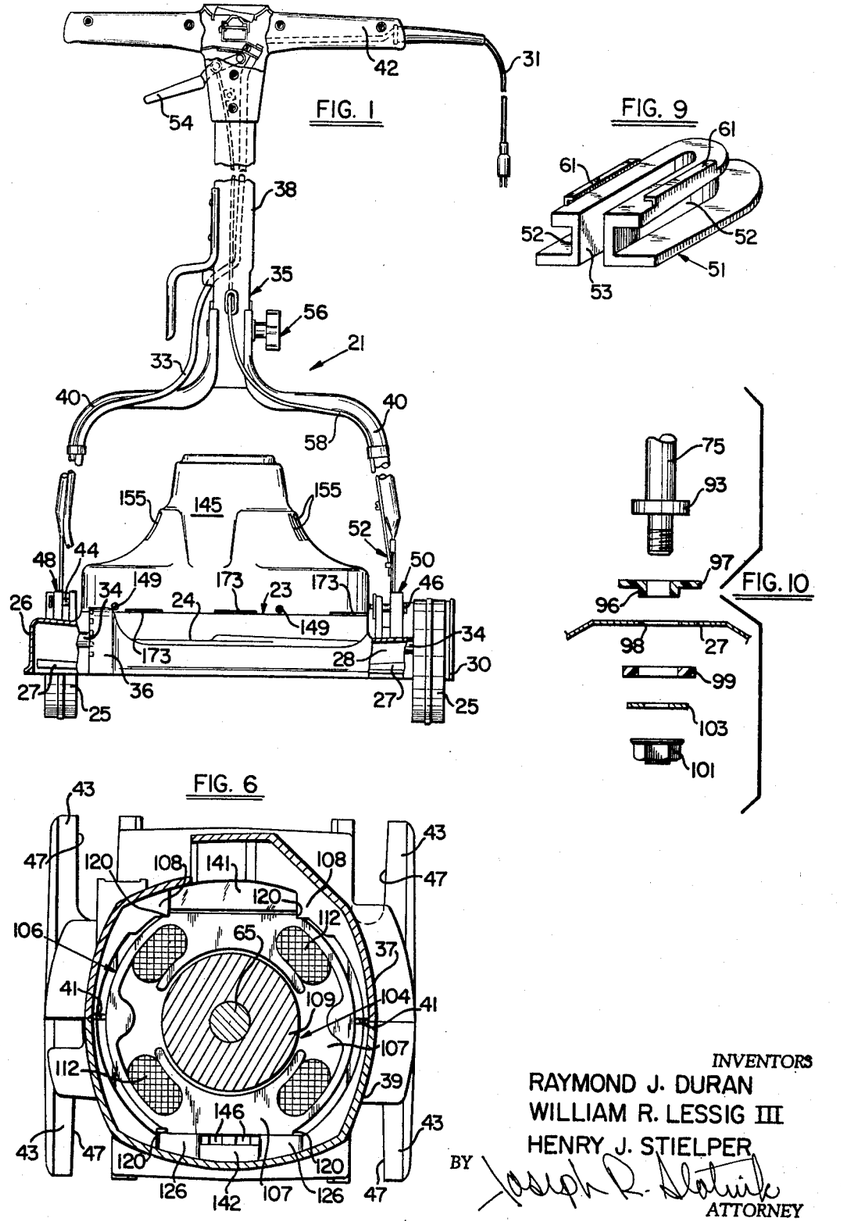
FIG. 1 is an elevational view, partly in section, illustrating a lawnmower embodying the present invention.
FIG. 6 is an enlarged sectional view of FIG. 2 taken along the line 6—6 thereof shown with electrical wiring and other parts removed for clarity.
FIG. 9 is an enlarged perspective view of one of the motor housing insulators.
FIG. 10 is an exploded sectional view illustrating the insulating construction for one of the blades.

Referring now more specifically to the drawings, a lawnmower embodying the present invention is illustrated generally at 21 in FIG. 1 and is seen to include a deck housing 23 supported for longitudinal movement relative to the ground by a plurality of wheels 25. A plurality of mowing blades 27 are supported beneath the housing 23 for rotation in a plane generally parallel to the ground. An electric motor 29, mounted atop the deck housing 23, rotatably drives the blades 27 through a transmission 22 and is connected to a suitable electric source by a power cord formed by an interconnected line cord 31 and motor cable 33 (see FIG. 2). An upstanding handle 35 is secured to the deck housing for manual manipulation and control of the mower.

The deck housing 23 preferably is integrally formed of, for example, cast aluminum or magnesium, sheet metal or other relatively strong, light-weight material, and includes a top 24 and a dependent, generally peripheral skirt 26 which together define an inverted, generally cup-shaped blade cavity 28. The blades 27 rotate in the blade cavity 28 and cooperate with passage means formed by depressions in the underside of the deck housing 23 and by the skirt 26 to direct grass cuttings through discharge opening means 30 located to one side of the mower so that the grass cuttings are discharged clear of and away from the operator. The particular configuration of the passage means and its cooperation with the blades forms no part of the present invention and therefore is not illustrated nor described in further detail here. However, for a better understanding thereof, reference may be made to the copending application of Jacobus J. Beckering et al., Ser. No. 628,363, filed Apr. 4, 1967, and owned by the assignee of the present invention.

The wheels 25 are each carried by a stub shaft 34 and the latter, in turn, are fixedly associated with respective ones of a plurality of feet 36 preferably formed integral with the housing 23. The feet 36 extend outwardly of the housing skirt 26 and are disposed two to the front and two to the rear of the housing 23. The stub shafts 34 desirably are adjustable vertically relative to their associated feet 36 to adjust the cutting height of the blades 27, for example, in the fashion illustrated and described in the copending application of William R. Lessig III et al., Ser. No. 628,438, filed Apr. 4, 1967, now Patent No. 3,428,328, issued Feb. 18, 1969, and owned by the assignee of the present application. However, since this construction forms no part of the present invention, it is not illustrated nor described further here.

The handle 35, shown in FIG. 1, includes interconnected upper and lower portions 38, 40, respectively. The upper portion 38 has insulating handle grips 42 secured thereto and the lower portion 40 is pivoted by pins 44, 46 at laterally spaced locations, to upstanding lug means 48, 50, respectively, integral with the deck housing 23. A handle latch mechanism 52 is provided at the interconnection of the lower handle portion 40 and the lug means 50 to lock the handle 35 in opposite pivoted positions so that the mower 21 can be pushed in both longitudinal directions. The latch mechanism 52 is releasable for handle reversing by lifting up on a lever 54 pivoted on the handle grips 42 and connected to the latch mechanism by a sheathed cable 58. In addition, the handle portions 38, 40 are held together by a clamp 56 but can be folded upon releasing the clamp 56 for mower storage and transportation. However, neither the latch mechanism 52 nor the handle clamp 56 form any part of the present invention and for that reason are not illustrated nor described further here. For a better understanding thereof, reference may be made to the copending applications of William R. Lessig III, and Raymond J. Duran et al., Ser. Nos. 629,727 and 623,955, filed Apr. 10, 1967, and Mar. 17, 1967, and both of which are owned by the assignee of the present application.

According to an important feature of the present invention, the motor 29 and the blades 27 are protectively insulated from the exposed mower components so that even if the motor should fall into disrepair and/or the blades cut the line cord 31, the likelihood of resulting injury to the operator or anyone touching any exposed part of the mower is greatly reduced.

Figure 2:
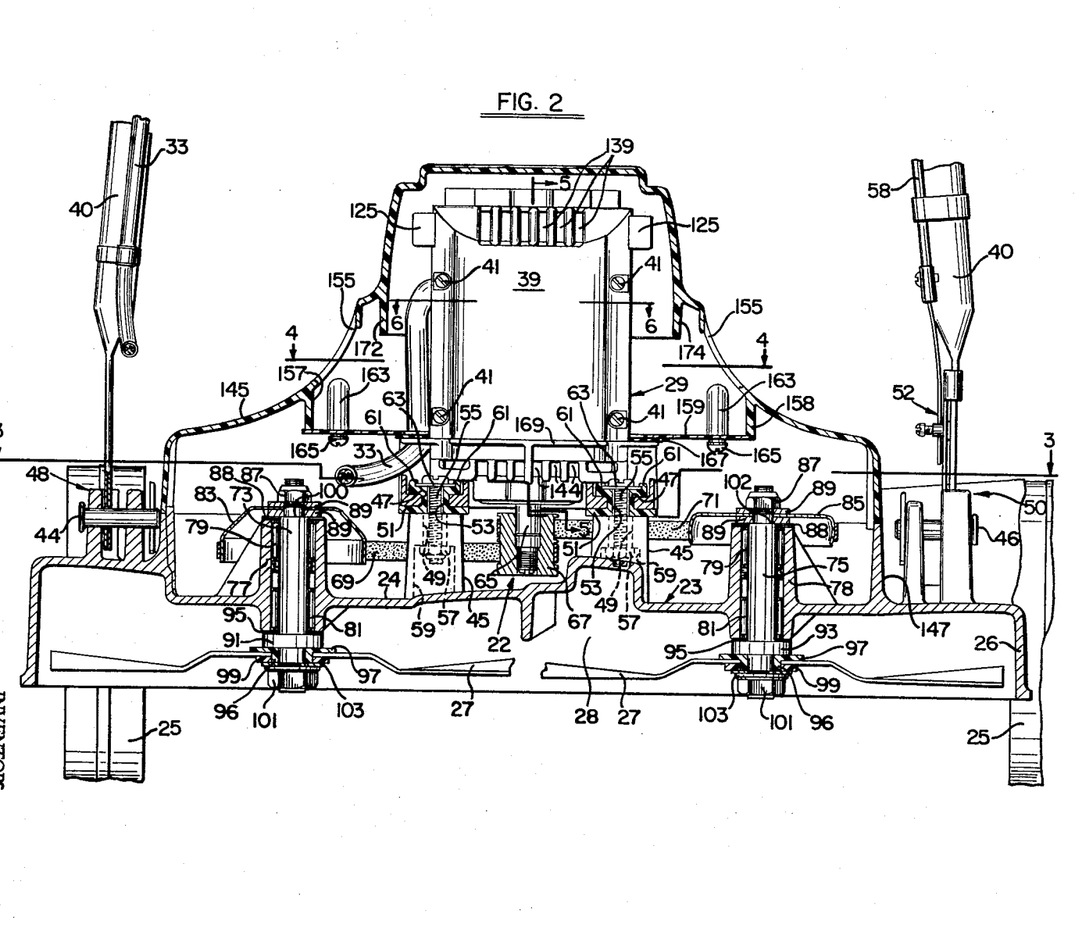
FIG. 2 is an enlarged, vertical sectional view illustrating the mower components and their interrelation embodying the present invention.
Figure 3:
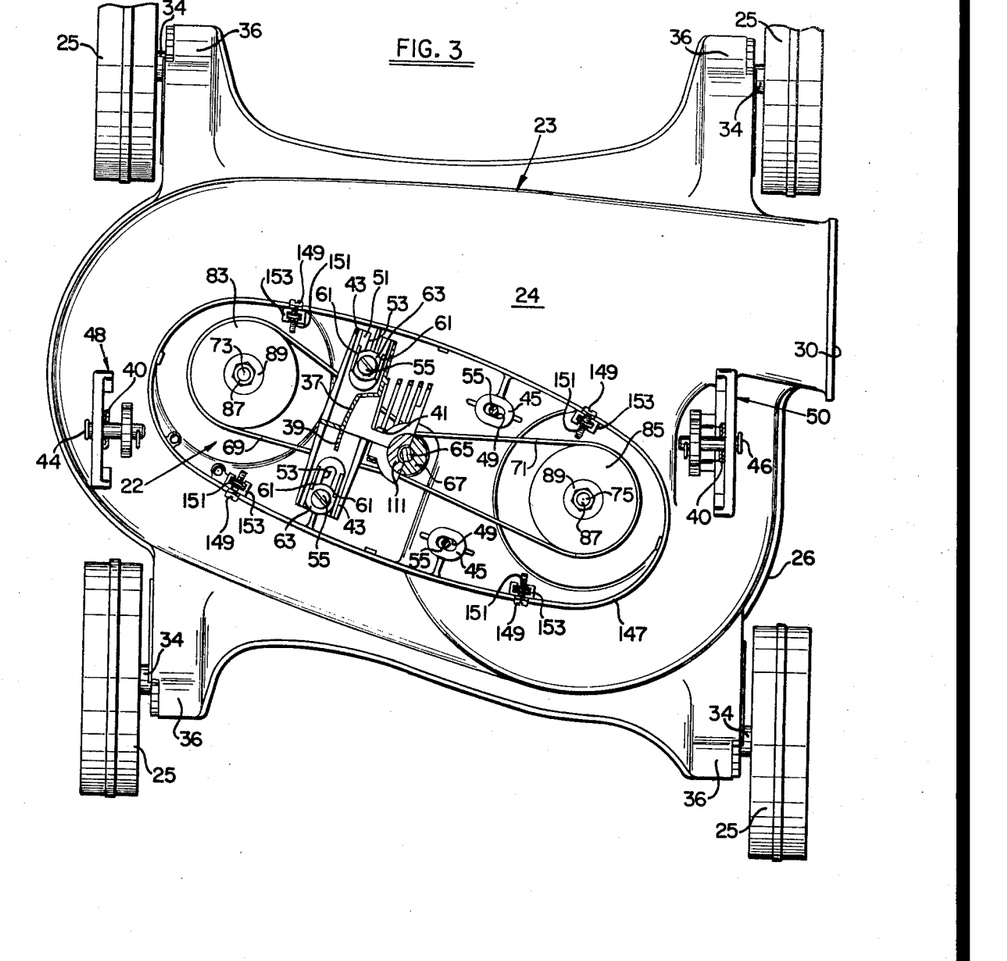
FIG. 3 is a sectional view, to a reduced scale, of the structure of FIG. 2 taken along the line 3—3 thereof.

Thus, as seen in FIGS. 2 and 4–6, the motor 29 is mounted within a motor housing 37 and housing cover 39 which are secured together in clam-shell fashion along a vertical parting plane by screws 41. The motor housing 37 is provided with a plurality of, and preferably, four horizontally extending feet 43 which are adapted to align with a like number of upwardly extending bosses 45, formed integral with the deck housing top 24 (FIGS. 2, 3, and 6). Each of the feet 43 has an elongated slot 47 formed therein while the bosses 45 have elongated apertures 49 adapted to align with the slots 47, the direction of elongation of the slots 47 and apertures 49 being in directions generally transverse to each other as shown in FIG. 3. A plug-like connection 60 is provided in the motor housing 37 for the two-fold purpose of providing a test connection when the mower is on the assembly line and a permanent connection for the motor cable 33 when the mower is fully assembled.

Each of the slots 47 is fitted with an elongated insulator 51 which has its sides and one end slotted as at 52 to slidably fit within each of the slots. Each of the insulators 51, shown in assembly in FIGS. 2 and 3, and in detail in FIG. 9, is constructed from an electrically insulating material possessing good dimensional stability characteristics such as, for example, the thermoplastic and thermosetting materials. One such material found highly acceptable for use here is the polycarbonate thermoplastic manufactured by General Electric under the trade name "Lexan." The insulators 51 are identical and each has an elongated slot 53 coincident with the slots 47 and adapted to align with the boss apertures 49. In assembly, the insulators 51 seat upon the bosses 45 and spacedly support the motor housing feet 43 therefrom. Mounting bolts 55 are insulated from the housing feet 43 by the insulators 51 and extend through respective aligned sets of slots 53 and apertures 49 and are held in place by nuts 57 seated in counterbores 59 in the underside of the bosses 45 (see FIG. 2). By loosening the bolts 55, the motor 29 can be adjusted laterally, or in a plane transverse to its axis. The insulators 51 fully isolate the motor housing 37 electrically from the bolts 55 and the deck housing 23 so that the latter remains insulated and safe to touch even if the motor housing 37 or the cover 39 for some reason become electrically "live." If desired, the insulators 51 may have retainer lips 61 formed on the top thereof for receiving a flange or washer 63 formed on the head of each bolt 55 or suitably disposed on each bolt 55 adjacent the head thereof and retained against axial movement relative thereto to prevent the bolts 55 from lifting out of the insulators 51 should the nuts 57 loosen during mower use. This further insures that the deck housing 23 remains electrically insulated from the motor housing.

The motor 29 has a rotatable output shaft 65 which extends below the motor housing and cover 37, 39 and is disposed between the bosses 45 (see FIG. 2). A drive sheave or pulley 67 is threaded as shown, keyed, or otherwise secured to the motor shaft 65 for rotation therewith and is adapted to concurrently drive a pair of endless belts 69, 71. A pair of spindles 73, 75 are journaled within elongated bosses 77, 78 integral with the deck housing top 24 by spaced needle bearings 79, 81 and extend generally parallel to and are spaced to opposite sides of the motor shaft 65. A pair of inverted, cup shaped pulleys 83, 85 are secured to upper reduced ends of the spindles 73, 75, respectively, by lock nuts 87 and washer 89, the latter being spaced from the bosses 77, 78 by fiber washers 88. The pulleys 83, 85 are adapted to be frictionally driven by the belts 69, 71, respectively, which are entrained thereover and over the sheave 67 and which are constructed from non-conductive materials to further enhance the protective characteristics of the mower. For example, laminated belts of neoprene and low-stretch tension material, such as wound glass fiber cord, and covered by rayon or Dacron transverse tire cord, have been found highly satisfactory both as to insulating properties as well as good wear and resistance to untracking during use. The pulleys 83, 85 encompass the bosses 77, 78, as shown in FIG. 2, and this, together with the relatively long axial length of the bosses and the long bearings 79, 81 provide maximum support for the spindles with a minimum overall height for the supporting structure.

The belt interconnection between the drive sheave 67 and the pulleys 83, 85 relies solely on friction so that if for any reason the transmission 22 is overloaded, such as, for example, when the blades 27 strike an obstruction, either or both of the belts 69, 71 can slip and damage to the motor 29 is prevented. The motor 29 is adjustable laterally on the deck housing 23 in a plane transverse to the axis of the motor shaft 65, as described briefly above, to provide the proper degree or tension in the belts 69, 71. One convenient way of adjusting this belt tension is to apply a predetermined biasing force to the motor housing 37 in a direction transverse to a line interconnecting the spindles 73, 75, and while this force is acting, the screws 55 are tightened.

The lower ends of the spindles 73, 75 are formed with annular flanges 91, 93 held in spaced relation to the bosses 77, 78 by fiber washers 95. The blades 27 which are below the flanges 91, 93, are insulated from the spindles 73, 75 by non-conductive blade positioners and washers 96, 99, are held in place on the spindles by nuts and washers 101, 103, respectively.

The blade positioners 96 and washers 99 are identical for each blade 27 and preferably are constructed from the same class of materials as the insulators 51. As seen in FIGS. 2 and 10, the blade positioners 96 fit snugly through an enlarged central aperture 98 in each blade and have a radially outwardly extending flange 97 adapted to space the blades 27 from the spindle flanges 91, 93. The washers 99 snugly receive the protruding end of a respective one of the spacers 96 and together therewith sandwich the central portion of the blades 27 therebetween. The washers 103 engage both the protruding ends of the spacers 96 and the washers 99, and are backed up by the nuts 101 which, which, when tightened, squeeze the blade positioners 96, the washers 99 and the blades 27 between the washers 103 and the flanges 91, 93. This squeezing action frictionally secures the blades 27 to the spindles 73, 75 so that the blades 27 will rotate with the spindles 73, 75.

It will be noted that by virtue of the construction described, tightening of the nuts 101 on the spindles 73, 75 to frictionally lock the blades 27 thereon is effected independently of the relation of the spindles 73, 75 and the bosses 77, 78 so that the desired degree of tightness for the blades 27 may be achieved without binding the spindles 73, 75. In similar fashion, the pulleys 83, 85 are clamped to the upper end of the spindles 73, 75 by the flat washers 89 which are squeezed in sandwich-like fashion on the pulleys and are trapped between the lock nuts 87 and shoulders 100, 102 on the spindles. The washers 89 position and rigidify the pulleys 83, 85 and by trapping these washers between the nuts 87 and the spindle shoulders 100, 102, the desired degree of tightness may be achieved independently of the relationship of the spindles and the bosses 77, 78. Here again, then, there is no tendency for the spindles to bind from tightening the nuts 87. The distance between the spindle shoulders 100, 102 and the flanges 91, 93, respectively, is slightly greater than the length of the bosses 77, 78 to allow free rotation of the spindles 73, 75 during use. Desirably, the fiber washers 88, 95 take up slack between the spindles 73, 75 and the bosses 77, 78 and eliminate noise therebetween.

It will be appreciated that the blade positioners 96 and washers 99 insulate the blades 27 from the spindles 73, 75, respectively, so that should the line cord 31 be cut by one of the blades, all the exposed mower components, including the spindles 73, 75 and the deck housing 23, are fully insulated therefrom and the operator is protected. The motor housing 37 is protectively insulated from the deck housing 23 by the insulators 51, as described above, and, furthermore, the belts 69, 71 which interconnect the motor shaft 65 and the spindles 73, 75 preferably are constructed from an insulating material so that the motor 29 and the blades 27, 28 are fully and protectively insulated from the exposed mower components.

It is important, for satisfactory mowing results, that the swaths defined in the blades 27 overlap so that the cutting path is continuous across the mower width. The center-to-center distance between the spindles 73, 75 is greater than the combined radii of the blades 27 so that these blades cannot collide and the need for a positive, timed interconnection therebetween is obviated. However, the spindles 73, 75 are staggered, as shown in FIG. 3, so that the blade swaths overlap in the longitudinal direction of mower travel. The effect of this is to provide a continuous cutting path across the mower width without any danger of the blades colliding. For a more detailed explanation of this arrangement, reference may be made to the copending application of Beckering et al., Ser. No. 628,363, filed Apr. 4, 1967, and owned by the assignee of the present application.

Figure 4:
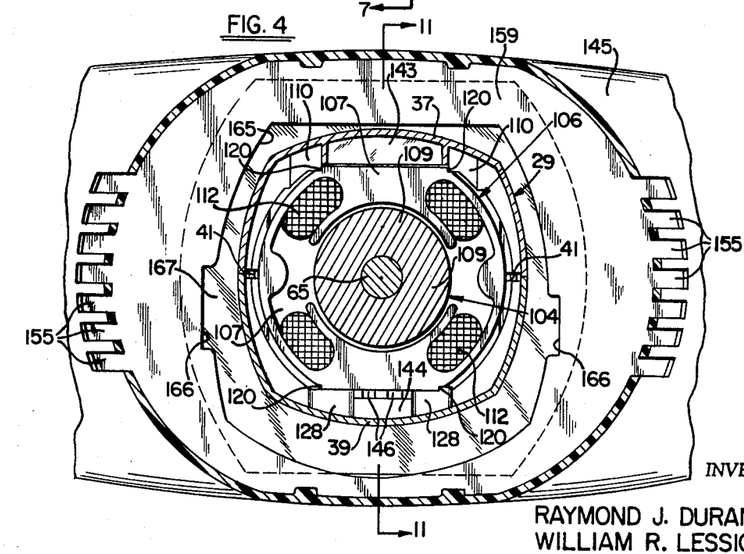
FIG. 4 is an enlarged, sectional view of FIG. 2 taken along the line 4—4 thereof.
Figure 5:
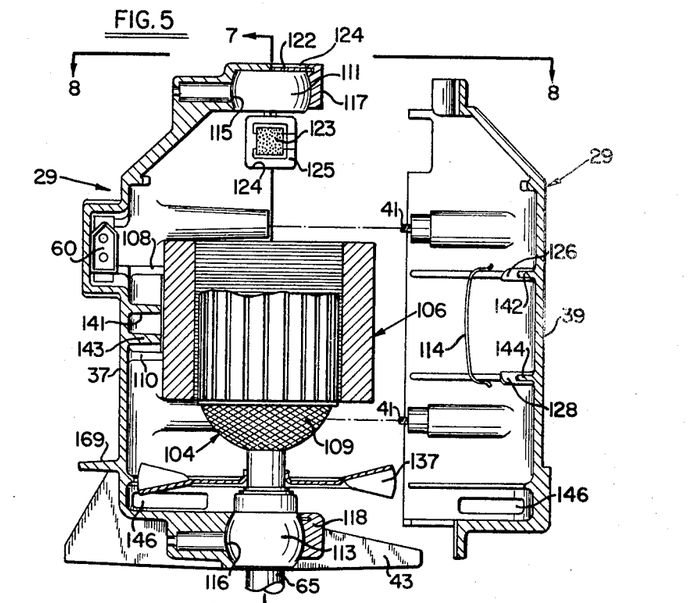
FIG. 5 is an enlarged exploded sectional view of FIG. 2 taken along the line 5—5 thereof shown with electrical wiring removed for clarity.
Figure 7:
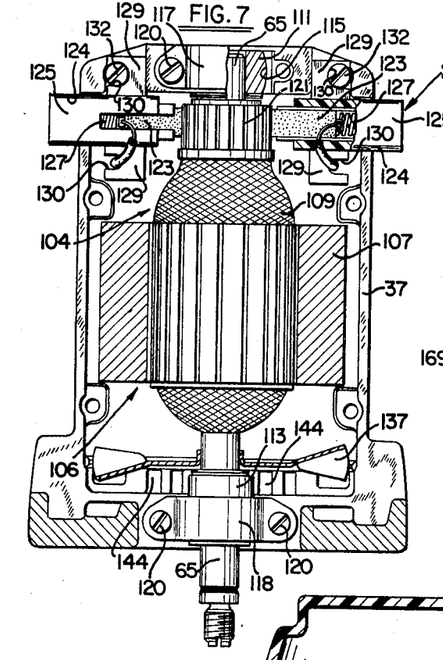
FIG. 7 is a sectional view of FIG. 5 taken substantially along the line 7—7 and showing some parts in elevation and others broken away for clarity.
Figure 8:
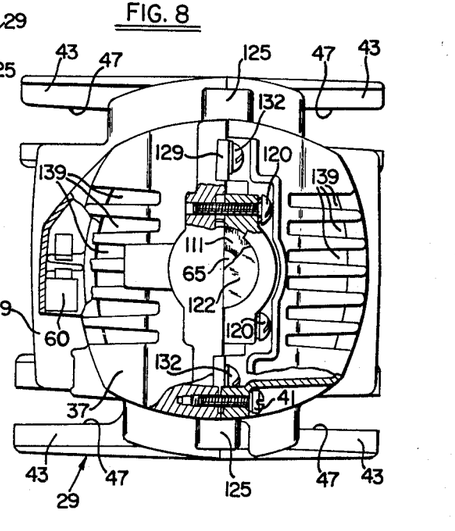
FIG. 8 is a top plan view, partly in section, of FIG. 5 taken along the line 8—8 thereof and with the parts assembled.

The motor 29, as described briefly above, is functionally insulated for normal, safe operation, is adapted to easy assembly and disassembly for part repair and/or replacement and is constructed for relatively cool operation. As seen best in FIGS. 4–8, the motor 29 is of the universal type and includes a rotatable armature 104 disposed centrally of a stationary field 106. The field 106 includes field windings 112 and stackings 107 with the latter being axially notched at four peripherally spaced locations 120 for receiving the corners on at least two sets of vertically spaced, segmented lands 108, 110 and 126, 128 formed integrally with the housing and housing cover 37, 39, respectively (see FIGS. 4 and 6). A leaf spring 114 lays over the lands 126, 128 and engages the stackings 107 to bias the latter snugly against the corners of the lands 108, 110. This construction securely positions and retains the field 106 within the motor housing 37 and cover 39. The armature 104 includes an armature windings assembly 109 and a commutator 121 insulated from and fixed upon the shaft 65 for rotation therewith (FIGS. 5 and 7). The shaft 65 is rotatably supported, top and bottom, by spherical bearings 111, 113 seated in concave recesses 115, 116 formed in the motor housing 37. The bearings 111, 113 are held in place by straps 117, 118 which also are concavely recessed and may have a silicone rubber compound within the recesses to take up clearance between the straps and the bearings. The straps 117, 118 are detachably secured to the motor housing 37 by screws 120 (see also FIG. 8). In this manner, the armature 104 is prevented from falling out of the motor housing 37 when the housing cover 39 is removed. A semi-circular dust shield 122 is fitted in a semi-annular groove 124 in the strap 117 above the bearing 113 and abuts the adjacent face of the motor housing 27 to form a dust seal for the bearing 113 (see FIGS. 5 and 8).

A pair of brushes 123 are carried by insulating brush holders 125 and are biased into engagement with the commutator 121 by springs 127 (FIG. 7). The brush holders 125 are identical and each extends through a slotted opening 124 at the parting plane between the housing 37 and cover 39, and each holder is provided with a pair of laterally extending arms 129 each of which is slotted at 130. In assembly, one of the arms 129 of each holder 125 is secured to the housing 37 by a screw 132 extending through the slot 130 therein and an electrical lead extends through and is positioned by the slot 130 in the other arm. In this manner, the brush holders 125 are completely interchangeable, are held in place on the motor housing 37 independently of the housing cover 39 and will remain in place when the cover 39 is removed.

It will be appreciated that the motor 29 is readily serviceable in place on the deck housing 23. Thus, when the screws 41 and cover 39 are removed, all the internal parts, for example, the brushes 123, are accessible and are removable simply by loosening the screws 132. If it is necessary to remove the motor from the housing 37, the screws 120 and the bearing straps 117, 118 are removed. Of course, the entire motor 29 can be removed from the deck housing 23 upon removing the screws 55.

A fan 137 is pressed on and rotates with the motor shaft 65 and serves to draw cooling air into openings 139 at the top of the motor housing 37 and cover 39 and moves this air downwardly through the motor 29. The motor housing 37 and housing cover 39 are provided with baffles 141, 143 and 142, 144, respectively, formed internally thereof intermediate the lands 108, 110 and 126, 128 and which together with the lands cooperate with the stackings 107 and restrict the flow of cooling air around the outside of the field 106. Thus, air is caused to pass between the stackings 107 and the armature windings 109 and exits through openings 146 at the bottom of the motor housing and cover 37, 39. In this manner, both the armature 104 and field 106 are cooled by this air moving through the motor 29.

Figure 11:
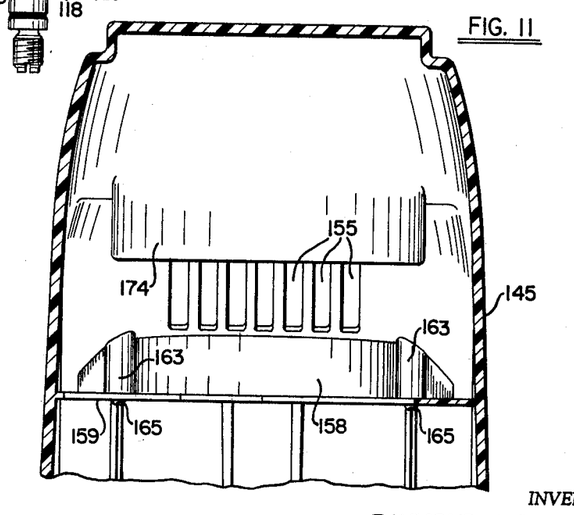
FIG. 11 is a sectional view of FIG. 4 taken along the line 11—11 thereof and with the motor removed to illustrate the protective motor shroud.

A protective shroud 145 spacedly covers the motor 29, the belts 69, 71 and the pulleys 83, 85 and seats upon an elliptical lip 147 formed on the deck housing 23 and is secured thereto by bolts 149 cooperating with nuts 151 trapped in pockets 153 integral with the lip 147. The shroud 145 may be formed of any suitable rigid material including rigid plastics, and metals if the shroud is sufficiently spaced from the motor 29. However, to enhance the insulating characteristics of the mower, the shroud 145 preferably is made of a protective, insulating material such as nylon or acrylonitrile-butadiene-styrene (ABS), and is provided with a plurality of air inlet openings 155 through which outside, cooling air passes. A pair of arcuately shaped, depending flanges 157, 158 are located at opposite ends of the shroud and below the inlet openings 155 and each flange has a pair of apertured bosses 163 formed thereon (see FIGS. 2 and 11). A rigid baffle plate 159 which may be constructed from the same class of materials as the shroud 145, is adapted to seat against the bottom of the flanges 157, 158 and fits snugly along the sides of the shroud, as shown in FIG. 4, and is secured in place by screws 165 threadedly received in the bosses 163. The baffle plate 159 has a relatively large, central opening 165 sufficient to easily pass vertically over the motor housing and cover 37, 39 and is notched at 166 to pass the brush holders 125 when the shroud 145 is mounted in place on the deck housing 23. An auxiliary baffle or flap 167, constructed from a rubber or rubber like material, is adapted to snugly fit over the motor housing and cover 37, 39 and seats upon a peripheral flange 169 formed thereon and snugly engages the baffle plate 159 to cover the opening 165 therein when the shroud 145 is in place on the deck housing 23. This prevents heated air, which exits the openings 146 in the bottom of the motor housing 37 and cover 39, from recirculating back through the motor 29. The heated air exits through slots 173 formed around the bottom edge of the shroud 145 adjacent the lip 147 on the deck housing top 24. Thus, motor cooling air is drawn in through openings 155 in the shroud 145 and openings 139 in the motor housing and cover 37, 39 and, after cooling the motor 29, exits through openings 144 and slots 173 above the deck housing 23. Splash guards 172, 174, formed on the shroud interior above the inlet openings 155, prevent water which might enter through openings 155 from wetting the motor components.

By the foregoing, there has been disclosed an improved electric lawnmower construction calculated to fullfill the inventive objects hereinabove set forth, and while a preferred embodiment of the present invention has been illustrated and described in detail, various additions, substitutions, modifications and omissions may be made thereto without departing from the spirit of the invention as encompassed by the appended claims.

We claim:

1. In a lawnmower of the type having a deck housing supported for longitudinal movement over the ground, a plurality of mowing blades fixed to spindles rotatably supported upon said deck housing, electric motor means on said deck housing and including a motor shaft, belt means interconnecting said motor shaft and said spindles; that improvement which comprises a housing for said motor supported on said deck housing, said motor housing having a base portion provided with a plurality of spaced apertures, said deck housing having spaced apertures aligned with said apertures in said base portion, fastened means extending through aligned ones of said apertures, aligned ones of said apertures in said motor housing base portion and said deck housing being elongated in directions transverse to each other, respectively, whereby to permit lateral adjustment of said motor housing relative to said deck housing, and insulator means interposed between said base portion and said deck housing adjacent said apertures electrically insulating siad base portion from said deck housing.

2. A construction as defined in claim 1 wherein said insulator means includes individual insulator members fitted within the apertures in said base portion and adapted to insulate said motor housing base portion from said fastener means.

3. A construction as defined in claim 1 wherein said apertures in said base portion are formed in elongated feet integral therewith, said apertures in said deck housing being formed in bosses integral therewith.

4. A construction as defined in claim 3 wherein said insulator means includes individual insulator members fitted on each of said feet and insulating the latter from said deck housing and said fastener means.

5. A construction as defined in claim 4 wherein said insulator members are constructed from the class of materials which includes thermoplastics and thermosetting materials.

6. A construction as defined in claim 4 wherein each of said feet is laterally slotted, said insulator members being adapted to fit into the slots in respective ones of said feet.

7. A construction as defined in claim 6 wherein said insulator members are slotted and define through, insulated openings in each of said feet through which said fastener means extend.

8. A construction as defined in claim 7 wherein said fastener means includes bolts adapted to extend through said insulated openings and said apertured bosses and cooperable with nuts for retaining said motor housing on said deck housing.

9. A construction as defined in claim 7 wherein said insulated openings and said boss apertures are elongated in directions generally transverse to each other to permit lateral adjustment of said motor housing relative to said deck housing.

10. A construction as defined in claim 6 wherein said insulator members are recessed along opposite outer side edges to slidably receive the inner edges of said feet.

11. In a lawnmower of the type having a deck housing supported for longitudinal movement along the ground, mowing blade means rotatably supported beneath said deck housing, electric motor means supported atop said deck housing; that improvement which comprises at least one spindle driven by said motor and extending through said deck housing, at least one blade having a central aperture and positioned on the lower end of said spindle, insulator means fitted into said aperture of said at least one blade and overlaying a portion thereof on opposite sides thereof, said at least one spindle having a fastener threaded on the lower end thereof for retaining said at least one blade in place thereon, shoulder means on said at least one spindle above said at least one blade, said threaded fastener being adapted to operatively engage and press said insulator means into operative engagement with said shoulder means.

12. A construction as defined in claim 11 which includes a pair of spindles each having an apertured blade secured thereto at the lower end thereof and insulated therefrom by one of said insulator means.

13. A construction as defined in claim 11 wherein said insulator means includes detachable insulator members.

14. A construction as defined in claim 13 wherein said insulator members include a first annular member fitted into said blade apertures and having a radially outwardly extending annular flange engaging one side of respective ones of said blades, and a second annular member engaging the other side of respective ones of said blades and said first annular member.

15. A construction as defined in claim 14 wherein said insulator members are constructed from the class of materials which includes thermoplastics and thermosetting materials.

16. A construction as defined in claim 11 wherein said motor means includes a motor shaft, and transmission means interconnecting said motor shaft and said at least one spindle including pulley means and insulating belt means.

17. A construction as defined in claim 16 wherein said transmission means includes first and second pulley means fixed to said motor shaft and blade spindle means, respectively, vertically elongated, apertured boss means formed on said deck housing and receiving said spindle means, bearing means within said boss means and rotatably supporting said spindle means, said second pulley means having an inverted, generally cup-shaped configuration encompassing at least a portion of said boss means.

18. A construction as defined in claim 17 wherein said second pulley means is located upon and secured to said spindle means by a pair of rigid, annular members secured on the upper end of said spindle means and sandwiching said second pulley means therebetween.

19. A construction as defined in claim 18 which includes fastener means threaded on the upper end of said spindle means and operatively engaging said rigid, annular members to press the latter into operative engagement with shoulder means on said spindle means.

20. In a lawnmower of the type having a deck housing supported for longitudinal movement along the ground, mowing blade means rotatably supported beneath said deck housing, electric motor means including a motor housing supported atop said deck housing and adjustable laterally relative thereto; that improvement which comprises a shroud secured to said deck housing and covering said motor housing, said motor housing having air inlet and outlet openings adjacent opposite ends thereof, fan means for drawing motor cooling air into said inlet openings and discharging it through said outlet openings, baffle means associated with said shroud and motor housing between said inlet and outlet openings, said baffle means including separate first and second baffle members, one of which is carried by said shroud and the other by said motor housing, said baffle members having adjacent faces which are cooperatively engageable in all adjusted positions of said motor housing, said shroud having inlet openings formed therein on the same side of said baffle means as said motor housing inlet openings, whereby cooling air passes into the shroud and thence into the motor housing inlet openings and through said motor housing, said shroud and said deck housing being constructed and arranged to deliver air, discharged from said motor housing outlet openings, outwardly of said shroud and above said deck housing.

21. A construction as defined in claim 20 wherein said first baffle member is an apertured plate fitted within and fixed to said shroud and spacedly surrounding said motor housing, and said second baffle member includes a flexible member surrounding said motor housing and adapted to overlap and engage said plate around the aperture therein.

22. A construction as defined in claim 20 wherein said motor includes a stationary field supported within said housing and a rotatable armature within said field, said housing having baffle means formed therein cooperable with said field to cause a major portion of the cooling air flowing therethrough to move between said armature and said field.

(References on following page)

References Cited

UNITED STATES PATENTS

| | | | |
|---|---|---|---|
| 1,674,258 | 6/1928 | Obergfell et al. | 174—138.2 |
| 3,068,631 | 12/1962 | Pegnani | 56—25.4 |
| 3,230,695 | 1/1966 | West | 56—25.4 |
| 3,272,952 | 9/1966 | McKeon | 174—138.2 |
| 3,298,163 | 1/1967 | Ottosen et al. | 56—25.4 |

FOREIGN PATENTS 1,795,021  5/1959  Germany.

RUSSELL R. KINSEY, Primary Examiner

U.S. Cl. X.R.

174—138; 200—168